US012785190B2

(12) United States Patent
Park et al.

(10) Patent No.: US 12,785,190 B2
(45) Date of Patent: Nov. 3, 2026

(54) BATTERY MODULE HAVING STRUCTURE CAPABLE OF ABSORBING CELL SWELLING, AND BATTERY PACK AND VEHICLE COMPRISING SAME

(71) Applicant: LG ENERGY SOLUTION, LTD., Seoul (KR)

(72) Inventors: Jun-Hee Park, Daejeon (KR); Yong-Hwan Ro, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 761 days.

(21) Appl. No.: 18/019,046

(22) PCT Filed: Aug. 2, 2021

(86) PCT No.: PCT/KR2021/010086

§ 371 (c)(1),
(2) Date: Jan. 31, 2023

(87) PCT Pub. No.: WO2022/030922

PCT Pub. Date: Feb. 10, 2022

(65) Prior Publication Data

US 2023/0282919 A1 Sep. 7, 2023

(30) Foreign Application Priority Data

Aug. 5, 2020 (KR) ........................ 10-2020-0098099

(51) Int. Cl.
*H01M 50/242* (2021.01)
*H01M 50/211* (2021.01)
*H01M 50/291* (2021.01)

(52) U.S. Cl.
CPC ....... *H01M 50/242* (2021.01); *H01M 50/211* (2021.01); *H01M 50/291* (2021.01)

(58) Field of Classification Search
CPC .................................................... H01M 50/242
See application file for complete search history.

(56) References Cited

U.S. PATENT DOCUMENTS

2006/0093899 A1 5/2006 Jeon et al.
2008/0124625 A1* 5/2008 Hock .................. H01M 8/2475 429/176

(Continued)

FOREIGN PATENT DOCUMENTS

CN 202259460 U 5/2012
CN 105518904 A 4/2016

(Continued)

OTHER PUBLICATIONS

European Search Report for European Application No. 21854315.5, dated Feb. 26, 2024.

(Continued)

*Primary Examiner* — Carlos Barcena
(74) *Attorney, Agent, or Firm* — Birch, Stewart, Kolasch & Birch, LLP

(57) ABSTRACT

A battery module includes a cell stack including a plurality of unit stacks each including a plurality of battery cells; a module housing accommodating the cell stack therein and including a plurality of insertion slits respectively formed in a top surface and a bottom surface; and at least one partition wall assembly located parallel to each of the plurality of battery cells, and located between adjacent unit stacks and deformed due to volume expansion due to swelling of the plurality battery cells to absorb the swelling, and having both upper and lower end portions inserted and fixed into the plurality of insertion slits.

20 Claims, 12 Drawing Sheets

(56) References Cited

U.S. PATENT DOCUMENTS

| | | | | |
|---|---|---|---|---|
| 2013/0207459 | A1* | 8/2013 | Schroder | H01M 50/264 307/10.1 |
| 2013/0252063 | A1 | 9/2013 | Park | |
| 2014/0370363 | A1 | 12/2014 | Oshiba et al. | |
| 2016/0218339 | A1 | 7/2016 | Nishimori et al. | |
| 2016/0268573 | A1 | 9/2016 | Ishihara et al. | |
| 2016/0329538 | A1 | 11/2016 | Hughes | |
| 2018/0183119 | A1 | 6/2018 | Ju et al. | |
| 2019/0006647 | A1 | 1/2019 | Ryu et al. | |
| 2019/0267591 | A1 | 8/2019 | Park et al. | |
| 2020/0212390 | A1 | 7/2020 | Kume et al. | |
| 2021/0351470 | A1 | 11/2021 | Uemura | |

FOREIGN PATENT DOCUMENTS

| | | | | | |
|---|---|---|---|---|---|
| CN | 106531917 | A | | 3/2017 | |
| CN | 207818693 | U | | 9/2018 | |
| CN | 110444722 | A | | 11/2019 | |
| CN | 209766556 | U | | 12/2019 | |
| CN | 211045543 | U | | 7/2020 | |
| EP | 3 565 023 | A1 | | 11/2019 | |
| JP | 50-139218 | | | 11/1975 | |
| JP | 2006-128122 | A | | 5/2006 | |
| JP | 2007-165698 | A | | 6/2007 | |
| JP | 2009-205844 | A | | 9/2009 | |
| JP | 2014-175078 | A | | 9/2014 | |
| JP | 2015-2082 | A | | 1/2015 | |
| JP | 2019-502250 | A | | 1/2019 | |
| JP | 2020-501320 | A | | 1/2020 | |
| JP | WO2019/049760 | A1 | | 8/2020 | |
| KR | 10-2006-0063174 | A | | 6/2006 | |
| KR | 10-0590050 | B1 | | 6/2006 | |
| KR | 20060063174 | A | * | 6/2006 | H01M 10/625 |
| KR | 10-1255250 | B1 | | 4/2013 | |
| KR | 10-2014-0011207 | A | | 1/2014 | |
| KR | 10-2016-0110167 | A | | 9/2016 | |
| KR | 10-2018-0003562 | A | | 1/2018 | |
| WO | WO 2020/004039 | A1 | | 1/2020 | |
| WO | WO 2020/028983 | A1 | | 2/2020 | |

OTHER PUBLICATIONS

International Search Report for PCT/KR2021/010086 mailed on Nov. 22, 2021.

* cited by examiner

BATTERY MODULE HAVING STRUCTURE CAPABLE OF ABSORBING CELL SWELLING, AND BATTERY PACK AND VEHICLE COMPRISING SAME

TECHNICAL FIELD

The present disclosure relates to a battery module having a structure capable of absorbing cell swelling, and a battery pack and a vehicle including the battery module, and more particularly, to a battery module having a structure in which a partition wall assembly is provided between unit stacks each including a plurality of battery cells to secure a space for accommodating the volume of a unit stack increased due to swelling of a battery cell, and a battery pack and a vehicle including the battery module.

The present application claims priority to Korean Patent Application No. 10-2020-0098099 filed on Aug. 5, 2020 in the Republic of Korea, the disclosures of which are incorporated herein by reference.

BACKGROUND ART

In order to sufficiently secure the capacity of a secondary battery, the number of battery cells located in a battery module should increase, and as the number of battery cells increases, a volume increment due to swelling also increases. As the volume increment increases, a force applied to a side wall of a module housing due to the swelling also increases. In order for the module housing to withstand the force without being deformed, a thickness of a plate of the module housing should be increased.

In order to absorb expansion caused by the battery cell swelling without excessively increasing the thickness of the module housing, in the prior art, a swelling absorbing pad having a certain thickness may be applied between adjacent battery cells and/or to both outmost edge portions of a battery cell stack. However, when the swelling absorbing pad is applied, because there is no separate fixing structure for holding the swelling absorbing pad, a process of accommodating a stack including the absorbing pad and the battery cells in the module housing is not easy.

That is, in order to prevent the battery cells and the absorbing pad from moving in the module housing, the battery cells and the swelling absorbing pad should be stacked to have a thickness greater than a width of the module housing, and then both sides of the stack should be pressed so that the pressed stack is accommodated in the module housing.

However, when the number of battery cells increases in order to secure the capacity of the secondary battery, the thickness of the stack including the battery cells and the swelling absorbing pad may inevitably increase, and thus the process of accommodating the stack in the module housing may not be easy and the battery cells may be interfered with the module housing and may be damaged during the accommodating process.

Accordingly, there is a demand for the development of a battery module structure capable of effectively absorbing volume expansion due to swelling of a battery cell and facilitating a process of inserting a battery cell stack into a module housing.

DISCLOSURE

Technical Problem

The present disclosure is designed to solve the problems of the related art, and therefore the present disclosure is directed to providing a battery module having a structure capable of effectively absorbing volume expansion due to swelling of a battery cell and facilitating a process of inserting a battery cell stack into a module housing.

Also, the present disclosure is directed to providing a battery module having a structure capable of easily handling the battery module in consideration of an increase in the weight of the battery module as the size and the number of battery cells applied to one battery module increases to secure capacity.

However, technical problems to be solved by the present disclosure are not limited to the above-described technical problems and one of ordinary skill in the art will understand other technical problems from the following description.

Technical Solution

In one aspect of the present disclosure, there is provided a battery module including: a cell stack including a plurality of unit stacks, each cell stack including a plurality of battery cells; a module housing accommodating the cell stack therein and including a plurality of insertion slits respectively formed in a top surface and a bottom surface; and at least one partition wall assembly located parallel to each of the plurality of battery cells, and located between adjacent unit stacks and deformed due to volume expansion due to swelling of the plurality battery cells to absorb the swelling, and having both upper and lower end portions inserted and fixed into the plurality of insertion slits.

The partition wall assembly may include: a pair of partition walls spaced apart from each other to face each other; and a pair of connectors respectively formed at a position downwardly spaced apart by a first distance from upper ends of the pair of partition walls and at a position upwardly spaced apart by a second distance from lower ends of the pair of partition walls, and configured to connect the pair of partition walls.

The plurality of insertion slits may be formed at positions corresponding to the pair of partition walls.

The pair of partition walls may be inserted into a respective pair of the plurality of insertion slits that are spaced apart from each other.

The pair of connectors may be spaced apart from each other by a distance equal to a height of the module housing.

Each of the pair of partition walls may include at least one handling hole formed in a portion exposed to the outside of the module housing through a respective one of the plurality of insertion slits.

Each of the pair of partition walls may have a length corresponding to an electrode assembly receiver of each of the plurality of battery cells.

Each of the module housing and the partition wall assembly may be formed of a metal material.

The module housing may include: a lower housing including a base plate and a pair of side plates; and an upper housing coupled to the lower housing.

The base plate and the pair of side plates of the lower housing may be integrally formed with each other, and a welding portion may be formed between the upper housing and the lower housing.

The welding portion may be formed between an inner surface of a respective one of the plurality of insertion slits and the partition wall.

In another aspect of the present disclosure, there are also provided a battery pack and a vehicle including the battery module.

Advantageous Effects

According to an aspect of the present disclosure, volume expansion due to swelling of a battery cell may be effectively absorbed, and a process of inserting a battery cell stack into a module housing may be facilitated.

Also, according to another aspect of the present disclosure, despite an increase in the weight of a battery module as the size and the number of battery cells applied to one battery module increases to secure capacity, the battery module may be easily handled.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
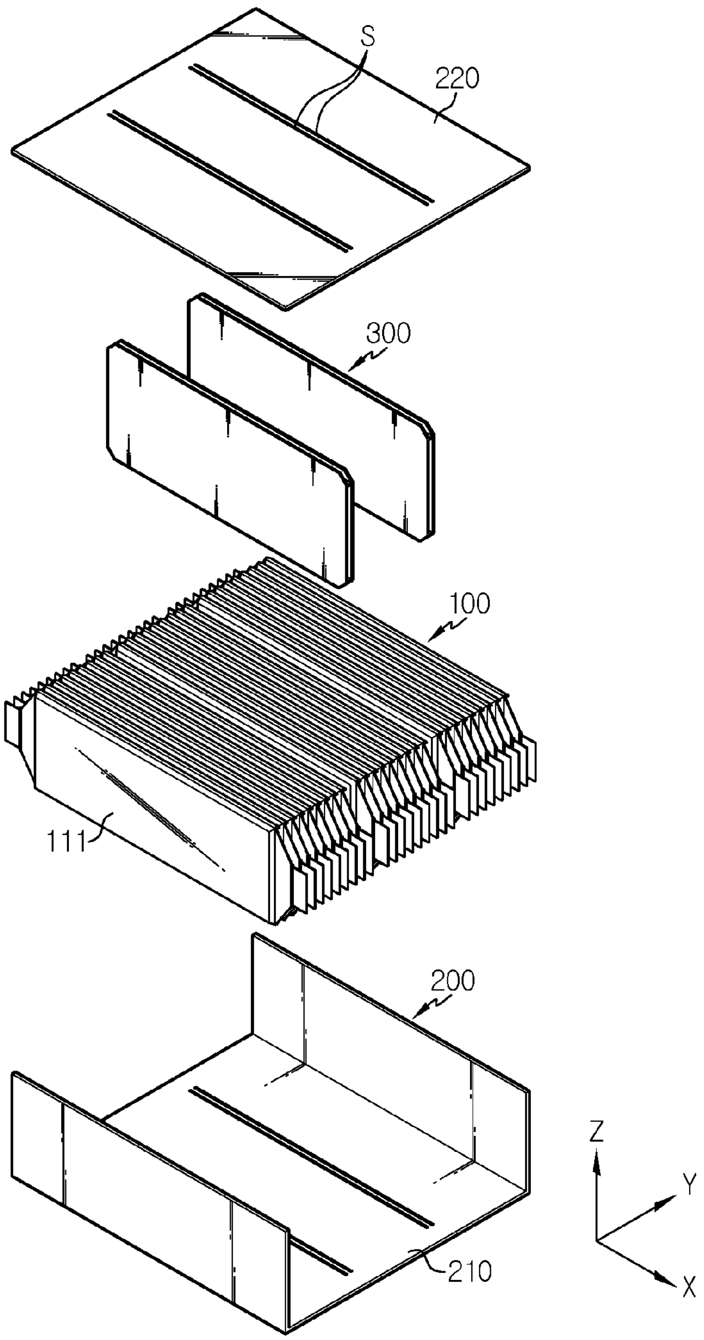
FIG. 1 is an exploded perspective view illustrating a battery module according to an embodiment of the present disclosure.

Referring to FIG. 1, a battery module according to an embodiment of the present disclosure includes a cell stack 100, a module housing 200, and a partition wall assembly 300.

Figure 2:
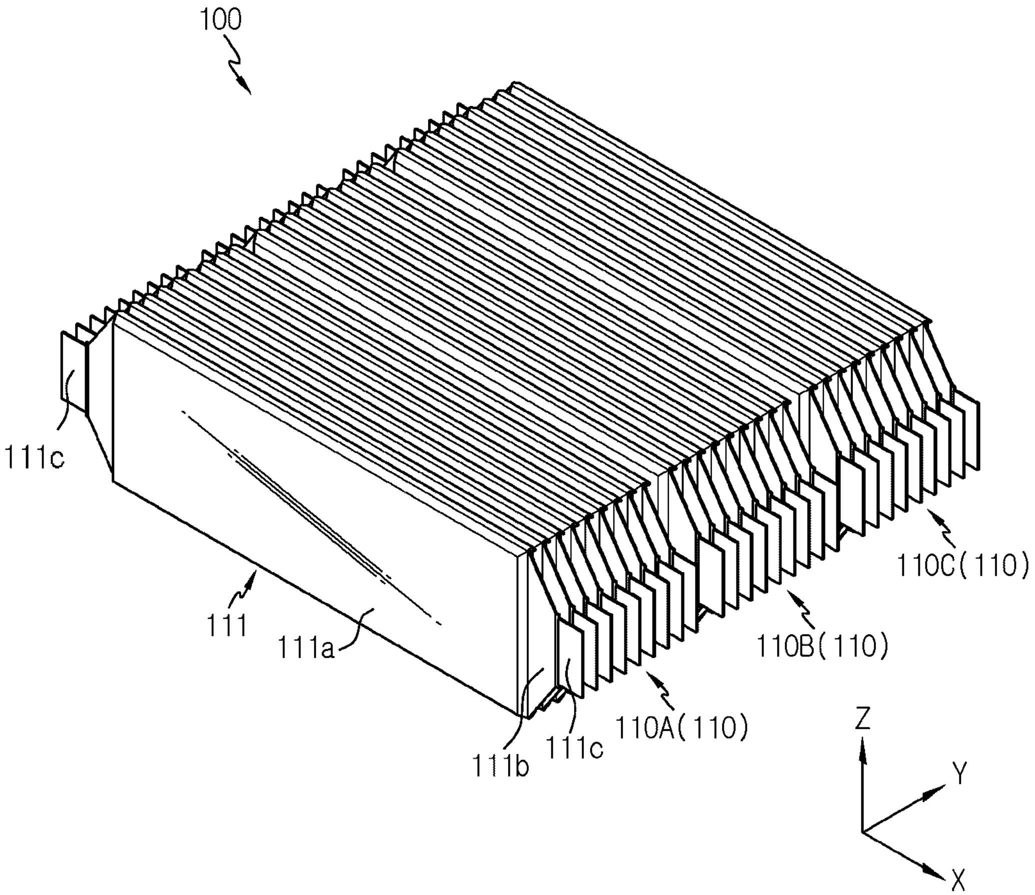
FIG. 2 is a view illustrating a cell stack of the present disclosure.
Figure 3:
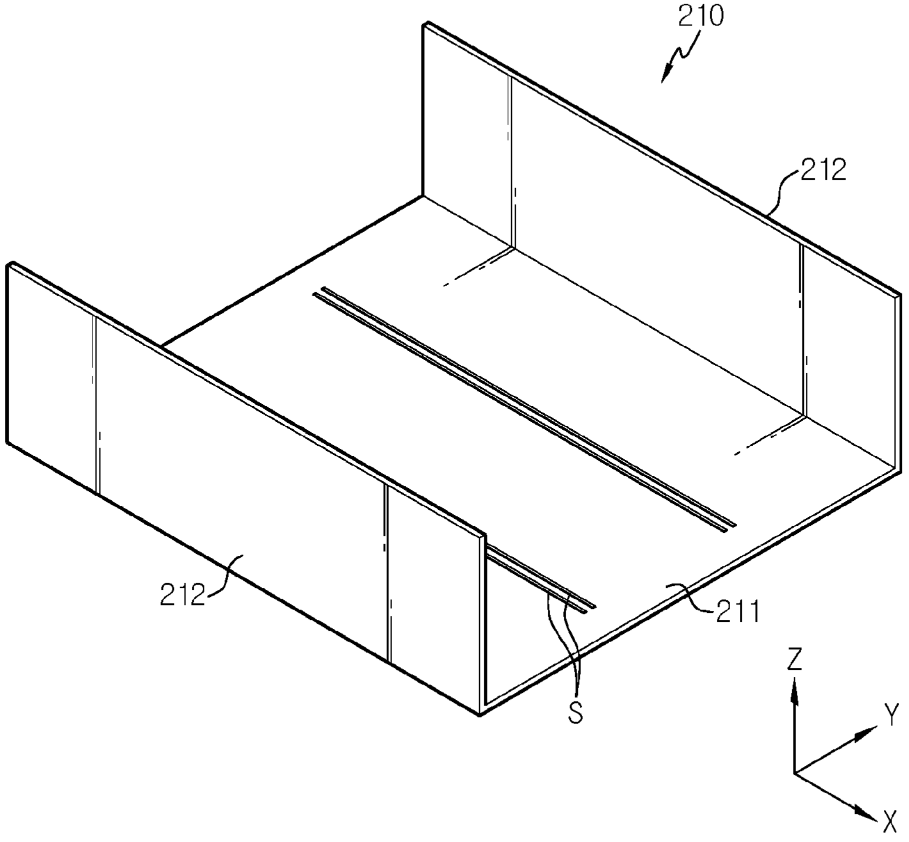
FIG. 3 is a view illustrating a lower housing of a module housing of the present disclosure.
Figure 4:
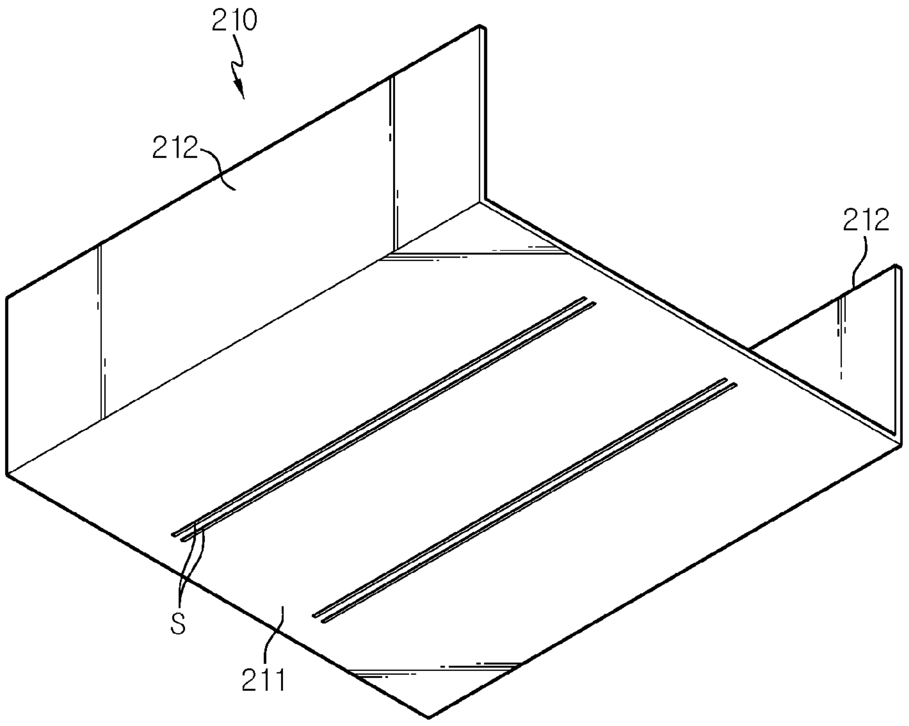
FIG. 4 is a view illustrating a bottom surface of the lower housing of FIG. 3.

Referring to FIGS. 1 and 2, the cell stack 100 includes a plurality of unit stacks 110. The partition wall assembly 300 is located between adjacent unit stacks 110. The unit stack 110 includes a plurality of battery cells 111 that are stacked to face each other.

For example, a pouch-type battery cell may be used as the battery cell 111. In this case, the battery cell 111 includes an electrode assembly receiver **111*a*, a sealing portion 111*b* formed around the electrode assembly receiver 111*a*, and a pair of electrode leads 111*c* connected to an electrode assembly (not shown) and drawn out to the outside of a pouch case through the sealing portion 111*b*. The pair of electrode leads 111*c* may be drawn out in opposite directions. The pair of electrode leads 111*c* may be exposed through front and rear opening portions of the module housing 200. The front and rear opening portions may be respectively formed on both sides in a longitudinal direction (direction parallel to an X-axis) of the module housing 200**.

The plurality of battery cells 111 are erected and stacked facing each other on a bottom surface (surface parallel to an X-Y plane) of the module housing 200, to form the unit stack 110. Although only three unit stacks 110 each including the plurality of battery cells 111 are illustrated in the present disclosure, this is merely an example and the number of unit stacks 110 may be two, or four or more.

Referring to FIGS. 1 through 4 and FIGS. 8 through 10, the module housing 200 accommodates the cell stack 100 therein, and includes a plurality of insertion slits S formed in a top surface and a bottom surface of the module housing 200. The module housing 200 may have open front and rear surfaces (surfaces parallel to a Y-Z plane). The module housing 200 may be formed of a metal material in consideration of rapid heat dissipation and rigidity.

The module housing 200 includes a lower housing 210 and an upper housing 220. The lower housing 210 includes a base plate 211 supporting the cell stack 100, and a pair of side plates 212 extending upward from both end portions in a width direction (direction parallel to a Y-axis) of the base plate 211. The base plate 211 and the side plates 212 may be integrally formed with each other.

Figure 5:
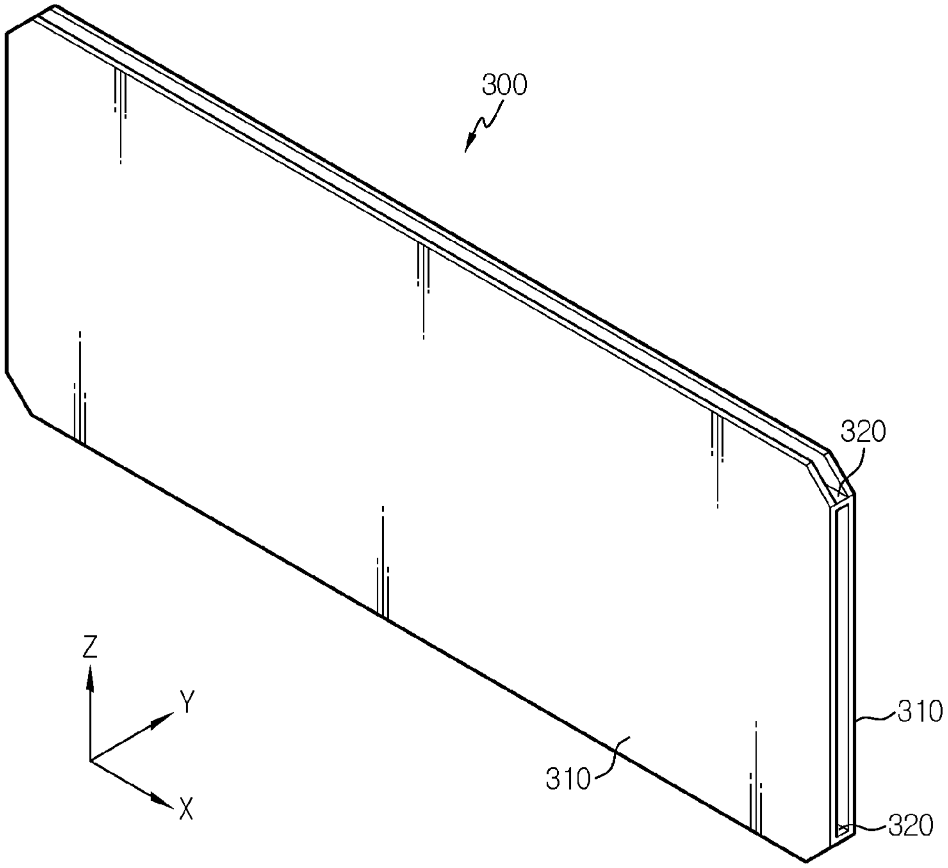
FIGS. 5 through 7 are views illustrating a partition wall assembly of the present disclosure.
Figure 6:
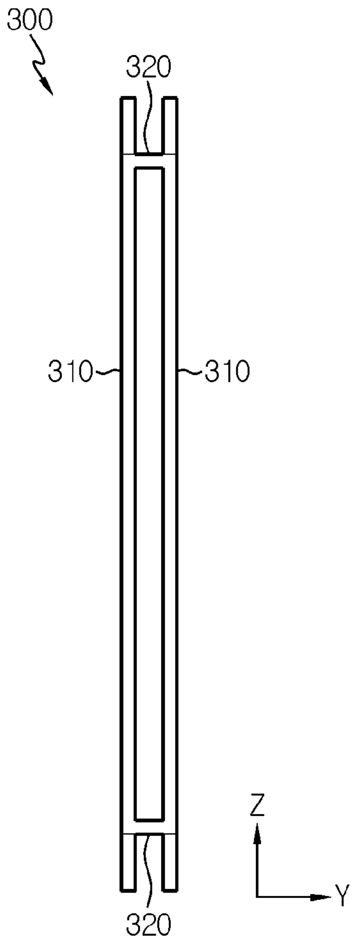
Figure 7:
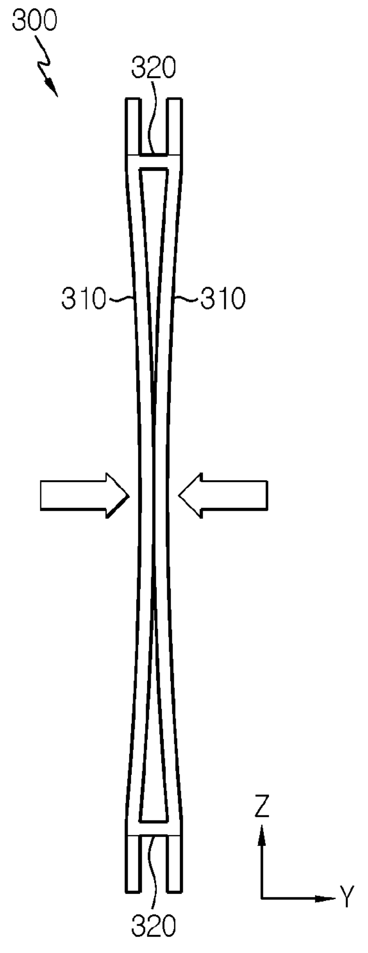
Figure 8:
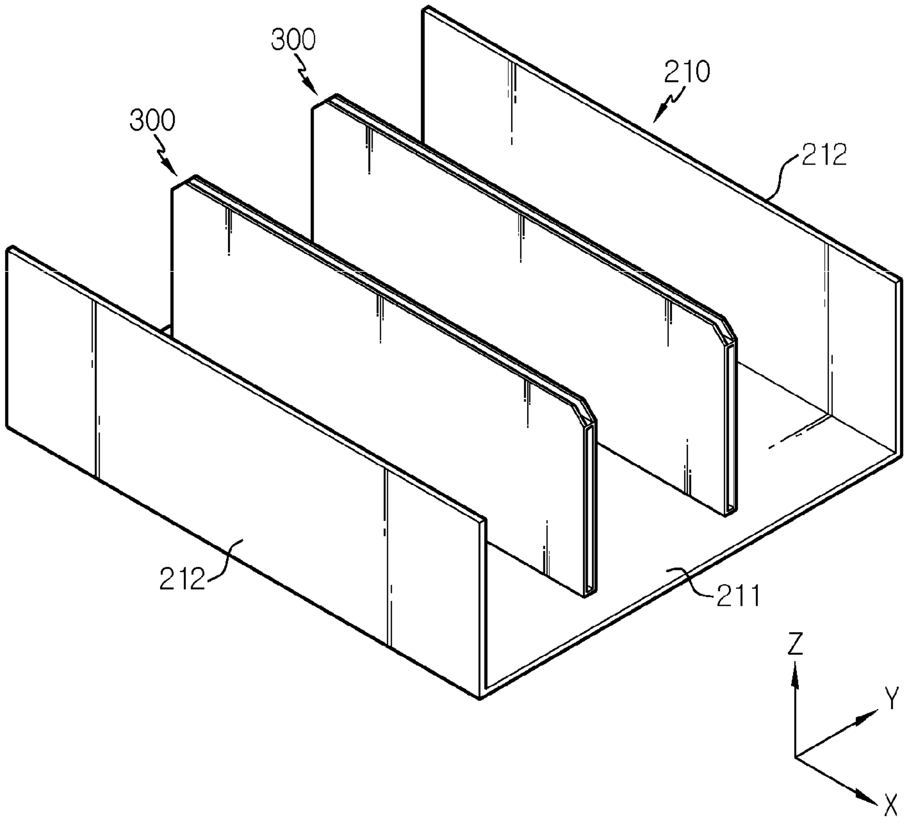
FIG. 8 is a view illustrating a state where the lower housing and the partition wall assembly of the present disclosure are coupled to each other.
Figure 9:
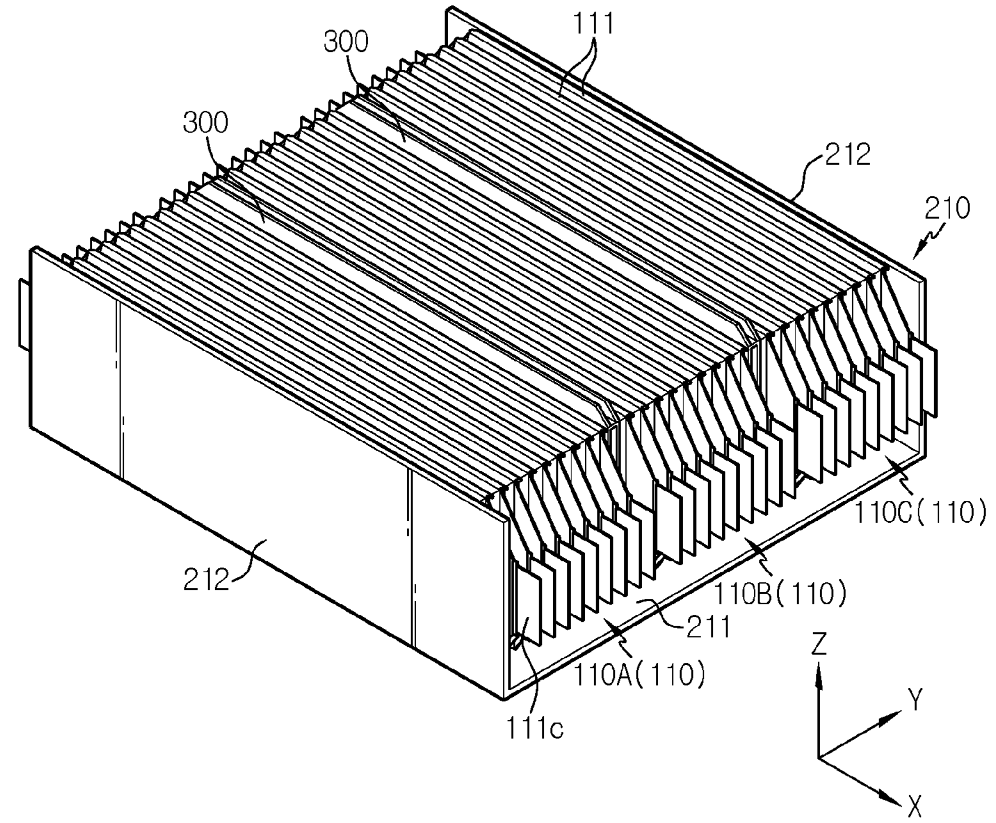
FIG. 9 is a view illustrating that unit stacks are inserted into a space between a side plate of the lower housing and the partition wall assembly and a space between a pair of adjacent partition wall assemblies of FIG. 8.
Figure 10:
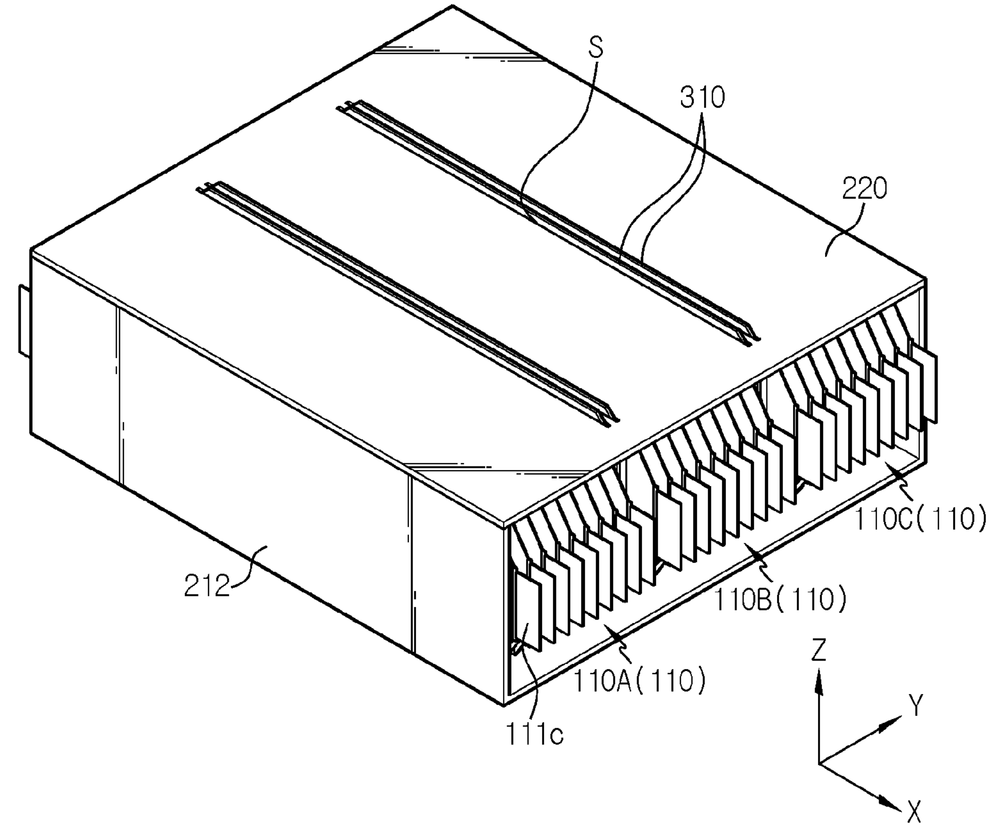
FIG. 10 is an assembled perspective view illustrated the battery module according to an embodiment of the present disclosure.

The base plate 211 includes a plurality of insertion slits S longitudinally extending in a longitudinal direction (direction parallel to the X-axis) of the base plate 211. The number of the insertion slits S corresponds to the number of partition walls 310 (see FIGS. 5 and 6) constituting the partition wall assembly 300 described below. The insertion slit S formed in the base plate 211 provides a space into which a lower end of the partition wall assembly 300 may be inserted and fixed. The side plates 212 face outermost battery cells 111 of the cell stack 100. When the partition wall assembly 300 is inserted and fixed through the insertion slit S formed in the base plate 211, a space into which each unit stack 110 may be inserted is formed between the side plate 212 and the partition wall assembly 300 and between a pair of adjacent partition wall assemblies 300.

The upper housing 220 is coupled to the lower housing 210 from the top of the cell stack 100 in a state where the cell stack 100 is seated on the lower housing 210. Both end portions in a width direction (direction parallel to the Y-axis) of the upper housing 220 are respectively coupled to the pair of side plates 212. For convenience of a process and prevention of damage to the cell stack 100, it is preferable that a process of coupling the upper housing 220 to the lower housing 210 is performed after a plurality of unit stacks 110A, 110B, 110C are respectively seated in a plurality of spaces formed by coupling between the lower housing 210 and the partition wall assembly 300.

A welding portion is formed between the partition wall assembly 300 and an inner surface of the insertion slit S. That is, the partition wall assembly 300 and the lower housing 210 are coupled to each other by using welding. A welding portion may also be formed between the lower housing 210 and the upper housing 220. That is, the lower housing 210 and the upper housing 220 may be coupled to each other by using welding. However, a coupling method between the lower housing 210 and the upper housing 220 is not limited thereto, and the lower housing 210 and the upper housing 220 may be coupled to each other by using a method such as bolting instead of welding. The upper housing 220 includes a plurality of insertion slits S respectively formed at positions facing the insertion slits S formed in the lower housing 210. Accordingly, when the upper housing 220 is coupled to the lower housing 210, an upper end of the partition wall assembly 300 already fixed to the lower housing 210 is exposed beyond the top of the module housing 200 through the insertion slit S formed in the upper housing 220. To increase a fastening force between the module housing 200 and the partition wall assembly 300, a welding portion may be formed between the partition wall assembly 300 and an inner surface of the insertion slit S formed in the upper housing 220. That is, the inner surface of the insertion slit S formed in the upper housing 220 and the partition wall assembly 300 may be coupled to each other by using welding.

Referring to FIGS. 5 through 10, the partition wall assembly 300 includes a pair of partition walls 310 and a pair of connectors 320 for connecting the pair of partition walls 310. The partition wall assembly 300 may be formed of a metal material, like the module housing 200.

The pair of partition walls 310 are spaced apart from each other to face each other. The pair of partition walls 310 are each in close contact with the electrode assembly receiver 111*a*, and are elastically deformed so that central portions thereof are closer to each other by pressure applied due to swelling of the battery cell 111 (see FIG. 7). That is, the partition wall assembly 300 functions to absorb the swelling of the battery cell 111. The partition wall 310 has a length and a width corresponding to the insertion slit S, and an upper end and a lower end of the partition wall 310 pass through the insertion slits S to be exposed to the outside of the module housing 200.

The partition wall 310 has a length corresponding to the electrode assembly receiver 111*a* of the outermost battery cell 111 of the unit stack 110. This is to enable the partition wall assembly 300 to effectively function as a cooling fin and function as an absorbing member for absorbing swelling, and to prevent a short-circuit by securing a certain distance or more between the electrode lead 111*c* and the partition wall assembly 300.

One of the pair of connectors 320 is formed at a position downwardly spaced apart by a certain distance from the upper end of the partition wall 310. The remaining one of the pair of connectors 320 is formed at a position upwardly spaced apart by a certain distance from the lower end of the partition wall 310. The connector 320 may function as a stopper for preventing the partition wall assembly 300 from being separated upward or downward from the module housing 200 through the insertion slit S. That is, the connector 320 is located inside the module housing 200. The pair of connectors 320 are spaced apart from each other by a distance corresponding to a height of the module housing 200, that is, a distance between the base plate 211 and the upper housing 220.

As described above, because the battery module according to an embodiment of the present disclosure includes the partition wall assembly 300 in the module housing 200, swelling of the battery cell 111 of the cell stack 100 may be absorbed.

Also, according to a battery module structure according to an embodiment of the present disclosure, the unit stacks 110A, 110B, 110C may be individually seated in a plurality of spaces formed when the partition wall assembly 300 is fixedly installed on the lower housing 210, and then the upper housing 220 may be fastened. Accordingly, when the number of the battery cells 111 constituting the cell stack 100 is very large, a process of seating the cell stack 100 may be easily performed, and thus damage to the cell stack 100 in a manufacturing process of the battery module may be prevented.

Figure 11:
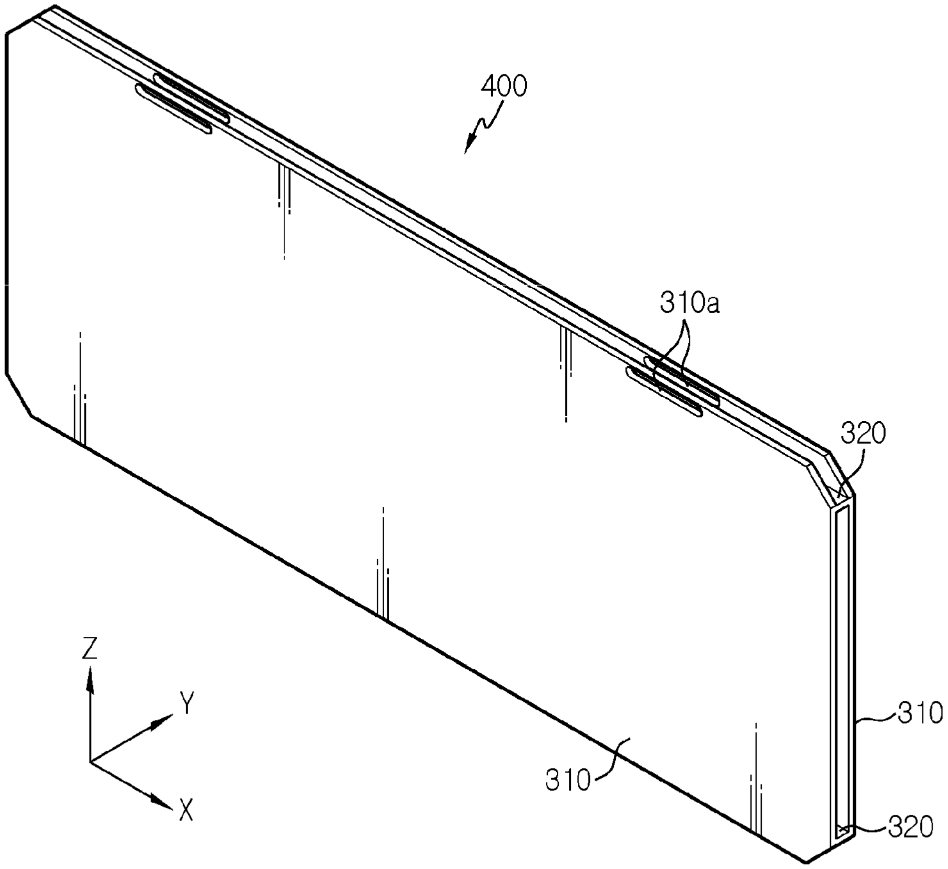
FIG. 11 is a view illustrating a partition wall assembly applied to a battery module according to another embodiment of the present disclosure.
Figure 12:
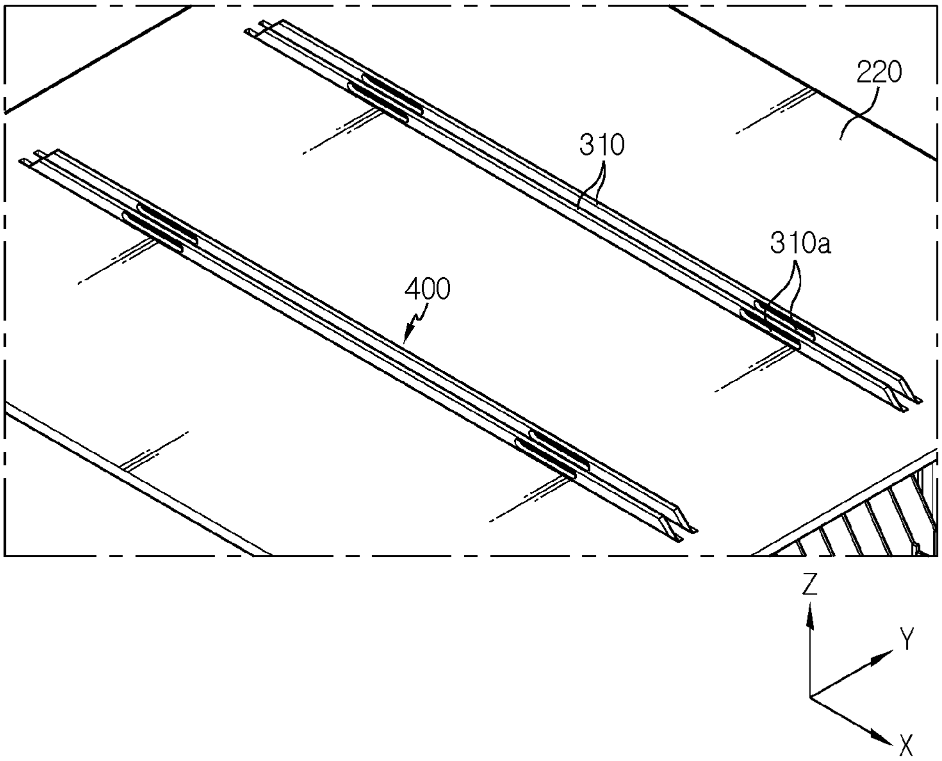
FIG. 12 is a view illustrating a top surface of the battery module according to another embodiment of the present disclosure.

A battery module according to another embodiment of the present disclosure will now be described with reference to FIGS. 11 and 12. When compared to the battery module according to an embodiment of the present disclosure described above, the battery module according to another embodiment of the present disclosure has a difference in a structure of a partition wall assembly 400, but the remaining elements are substantially the same. Accordingly, in describing the battery module according to another embodiment of the present disclosure, the same description as that made in the above embodiment will be omitted and the following will focus on a difference.

The partition wall assembly 400 includes at least one handling hole 310*a* formed in a portion exposed to the outside of the module housing 200 through the insertion slit S formed in a top surface of the module housing 200, that is, in the upper housing 220. The handling hole 310*a* may be formed in each of the pair of partition walls 310 constituting the partition wall assembly 400, or may be formed in only one of the pair of partition walls 310. The handling hole 310*a* may help an operator to easily handle the battery module.

To secure sufficient capacity, when the size and the number of the battery cells 111 constituting the battery module increase, the weight of the battery module inevitably increases. Accordingly, in order for the operator to easily handle the battery module, a gripping means formed on an outer surface of the battery module is required. The battery module according to another embodiment of the present disclosure may fulfill the requirement by providing the handling hole 310*a* formed by using the partition wall assembly 300 exposed to the outside of the module housing 200.

The present disclosure has been described in detail. However, it should be understood that the detailed description and specific examples, while indicating preferred embodiments of the present disclosure, are given by way of illustration only, since various changes and modifications within the scope of the present disclosure defined by the appended claims will become apparent to one of ordinary skill in the art from this detailed description.

What is claimed is:

1. A battery module comprising:

a cell stack comprising a plurality of unit stacks, each unit stack comprising a plurality of battery cells;

a module housing accommodating the cell stack therein and comprising a plurality of insertion slits respectively formed in a top surface and a bottom surface; and at least one partition wall assembly located parallel to each of the plurality of battery cells, and located between adjacent unit stacks and deformed due to volume expansion due to swelling of the plurality battery cells to absorb the swelling, and having an upper edge inserted and fixed into the plurality of insertion slits in the top surface of the module housing and a lower edge inserted and fixed into the plurality of insertion slits in the bottom surface of the module housing.

2. The battery module of claim 1, wherein the partition wall assembly comprises:

a pair of partition walls spaced apart from each other to face each other; and a pair of connectors respectively formed at a position downwardly spaced apart by a first distance from upper ends of the pair of partition walls and at a position upwardly spaced apart by a second distance from lower ends of the pair of partition walls, and configured to connect the pair of partition walls.

3. The battery module of claim 2, wherein the plurality of insertion slits are formed at positions corresponding to the pair of partition walls.

4. The battery module of claim 3, wherein the pair of partition walls are inserted into a respective pair of the plurality of insertion slits that are spaced apart from each other.

5. The battery module of claim 4, wherein the pair of connectors are spaced apart from each other by a distance equal to a height of the module housing.

6. The battery module of claim 2, wherein each of the pair of partition walls comprises at least one handling hole formed in a portion exposed to the outside of the module housing through a respective one of the plurality of insertion slits.

7. The battery module of claim 2, wherein each of the pair of partition walls has a length corresponding to an electrode assembly receiver of each of the plurality of battery cells.

8. The battery module of claim 2, wherein each of the module housing and the partition wall assembly is formed of a metal material.

9. The battery module of claim 2, wherein the module housing comprises:

a lower housing comprising a base plate and a pair of side plates; and an upper housing coupled to the lower housing.

10. The battery module of claim 9, wherein the base plate and the pair of side plates of the lower housing are integrally formed with each other, and a welding portion is formed between the upper housing and the lower housing.

11. The battery module of claim 10, wherein the welding portion is formed between an inner surface of a respective one of the plurality of insertion slits and the partition wall.

12. The battery module of claim 2, wherein the pair of connectors have a fixed length in a direction between the pair of partition walls.

13. The battery module of claim 2, wherein the partition wall assembly further comprises an upper edge portion extending above an upper connector of the pair of connectors and a lower edge portion extending above a lower connector of the pair of connectors, and wherein the upper edge portion is inserted and fixed into the plurality of insertion slits in the top surface of the module housing and the lower edge portion is inserted and fixed into the plurality of insertion slits in the bottom surface of the module housing.

14. The battery module of claim 2, wherein an upper connector of the pair of connectors acts as a stopper against the top surface of the module housing and a lower connector of the pair of connectors acts as a stopper against the bottom surface of the module housing.

15. The battery module of claim 2, wherein an upper edge of each of the pair of partition walls is inserted and fixed into the plurality of insertion slits in the top surface of the module housing and a lower edge of each of the pair of partition walls is inserted and fixed into the plurality of insertion slits in the bottom surface of the module housing.

16. The battery module of claim 2, wherein the pair of connectors are spaced apart from each other by a distance equal to a height of the module housing.

17. The battery module of claim 1, wherein the at least one partition wall assembly extends through the plurality of insertion slits and a portion of the at least one partition wall assembly is exposed outside the module housing.

18. The battery module of claim 1, wherein the plurality of insertion slits extend in a first direction and are spaced from edges of the top surface and the bottom surface in the first direction.

19. A battery pack comprising the battery module according to claim 1.

20. A vehicle comprising the battery module according to claim 1.

* * * * *